United States Patent [19]
Fahim et al.

[11] Patent Number: 5,459,716
[45] Date of Patent: Oct. 17, 1995

[54] FACILITY RESTORATION FOR TELECOMMUNICATIONS NETWORKS

[75] Inventors: Furrukh Fahim, Dallas; Hsueh-Mei Chiu, Richardson; Darrell B. Piatt, Plano, all of Tex.; Maude A. deLaski, Pleasantville, N.Y.

[73] Assignee: MCI Communications Corporation, Washington, D.C.

[21] Appl. No.: 228,616

[22] Filed: Apr. 15, 1994

[51] Int. Cl.⁶ .................................................. H04J 3/14
[52] U.S. Cl. ........................................... 370/16; 370/54
[58] Field of Search ........................... 370/16, 13, 16.1, 370/60, 94.1, 58.2, 54, 79; 371/8.1, 11.1, 11.2, 23; 379/2, 221, 273, 274

[56] References Cited

U.S. PATENT DOCUMENTS

| | | | |
|---|---|---|---|
| 4,999,829 | 3/1991 | Fite, Jr. et al. | 370/16 |
| 5,058,105 | 10/1991 | Mansour et al. | 370/16 |
| 5,146,452 | 9/1992 | Pekarske | 370/16 |
| 5,179,329 | 1/1993 | Nishikawa et al. | 364/449 |
| 5,182,744 | 1/1993 | Askew et al. | 370/16 |
| 5,218,601 | 6/1993 | Chujo et al. | 370/16 |
| 5,233,600 | 8/1993 | Pekarske | 370/16 |
| 5,263,080 | 11/1993 | Jones et al. | 370/60 |
| 5,289,536 | 2/1994 | Hokari | 379/221 |
| 5,311,502 | 5/1994 | Mueller et al. | 370/16 |

Primary Examiner—Douglas W. Olms
Assistant Examiner—Shick Hom
Attorney, Agent, or Firm—Pollock, Vande Sande & Priddy

[57] ABSTRACT

A method for rapidly restoring disrupted communications services between nodes of a network following a loss of service due to a circuit outage such as may occur, for example, as a result of an optical fiber cable break. The method is operable, however, irrespective of the transmission technology. Treating the telecommunications traffic as a commodity, a multicommodity model is developed using a measure of the commodities desired to be restored between network nodes and the capacity available for restoral in spare and impacted edges of the network. Action variables are established by use of representational "dummy nodes pairs" interconnected by "action edges." A multicommodity algorithm is applied to the model and to the decision variables to determine reroutes and actions to be taken within nodes of the network to effect the restoral reroutes. Preferably, the process is carried out in real time or near real time by computing apparatus and such that the outage is located via a control network and whereby the instructions for restoral actions are returned to the network nodes. Operation also preferably takes into consideration the priority of the telecommunications commodity to be restored and the relative costs of restoral so that higher priority commodities are restored first at lowest cost.

9 Claims, 8 Drawing Sheets

FACILITY RESTORATION FOR TELECOMMUNICATIONS NETWORKS

This invention relates in general to the restoration of communications facilities following a disruption of traffic due to an unplanned outage of some sort and in particular to a method for quickly finding and implementing reroutes for traffic following such an outage.

BACKGROUND OF THE INVENTION

In the field of telecommunications, particularly in connection with the implementation of long distance networks, there is continuing pressure to increase the traffic carrying capability of the transmission media. For example, since fiber optic cables can carry large numbers of circuits, they are used increasingly for connecting network stations and other network elements. One result of this compaction is that an outage due to a fiber cable break, for example, can cause massive disruption of services to a large number of network customers and users. The ability to quickly and economically restore traffic affected by these outages is therefore of considerable benefit. Restoring the highest value, highest priority circuits first, and as many circuits as possible for a complex network is a difficult problem to say the least, and efficient, workable solutions, appropriate for today's high capacity networks are being sought.

Despite the trend to high capacity media and the capabilities of fiber optics in that regard, there has not been an immediate, sweeping implementation of fiber optical systems. Although the reasons for that are not especially relevant here, one result has been that current networks are generally hybrid in nature and older technologies are used in combination with emerging technologies. Thus, in dealing with restoral problems it is desirable that the solutions be independent of the technology used in the network.

Heretofore, to deal with the problem of network outages, one of the techniques used was to simulate different failure scenarios in advance and to establish from those scenarios appropriate instructions (or preplans) that could be used at stations of the network to establish restoral routes to recover from the outage. Since the number of failures possible in a network can be very large it is not always practical to have instructions or a plan for every scenario. Furthermore, since technological improvements allow network topologies to be changed relatively quickly and easily, long distance networks are not as static as in the past and preplans for restoration quickly become outdated.

It has become essential therefore to quickly determine and implement alternate routes for the impacted circuits on the network topology as it remains.

On one hand, large numbers of routes need to be determined with limited resources; on the other hand, routes need to be restored in near real time to maintain reliable communications.

It is therefore among the objectives of the present invention to provide a method for quickly restoring routes between network stations (or nodes) following a disruption of service due to circuit outages such as those that result from a cable break between stations. Further, it is sought to provide such a method which will be independent of the transmission technologies used in the network and which will assure that routes of highest priority will be restored in preference to those of lower priority, preferably taking into account the relative costs of alternate routing.

SUMMARY OF THE INVENTION

Briefly described, in at least one form, the invention provides a method for restoring disrupted communications services between nodes of a network, irrespective of the transmission technology used, following a loss of service due to a circuit outage.

Initially, a multicommodity model is developed using information indicative of where within the network the outage occurred and information on available circuit routing data. A measure of the commodities (i.e., the telecommunications traffic affected by the outage) desired to be restored and the capacity for restoral are determined; the latter being preferably determined from the remaining capacity in circuits which were carrying traffic affected by the outage and from spare capacity.

For implementation of the reroutes, and for determining actions actually to be taken within the network nodes (or stations) for that purpose, decision variables are established by the use of dummy node pairs, one such pair being representationally created for each certain circuit group incident upon a node, grouped by some criteria which the incident circuits have in common. Potential action connections are representationally created between the dummy nodes so that all possible actions are considered and from these a set of connections are selected for actual implementation within the stations of the network affected by the rerouting.

A multicommodity algorithm is applied to the model and to the decision variables to determine reroutes for the communications commodities disrupted and for actions to be taken within stations for the rerouting. Preferably the algorithm is applied to each affected commodity in order of assigned priority. This allows reroutes to be found for higher priority communications first, although potentially to the exclusion of lower priority communications. The lower priority commodities are then solved in turn, in order of priority, until either all traffic is restored or the supply of capacity for restoral is exhausted.

Since rerouting by certain paths are more costly than others and since certain actions to be taken in a network node, or station, for implementing the reroutes may be more costly than others, in a preferred form the invention is operative so that relative cost factors are considered as each commodity is solved for. For example, it is generally less costly to use any remaining capacity in an impacted route (or "edge") than to use spare trunks, or circuits, which have been set aside for restoral purposes. Similarly, it is less costly to take actions within a node by automatic means than by manual patching. Relative costs are established for these various alternatives and are considered in the commodity solution so that not only are reroutes determined based on priority but also for restoral at lowest cost.

Directions for carrying out the selected actions are transmitted to the stations, preferably for automatic implementation, although manual actions (e.g., manual patching) may be provided for.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DESCRIPTION OF THE INVENTION

Figure 1:
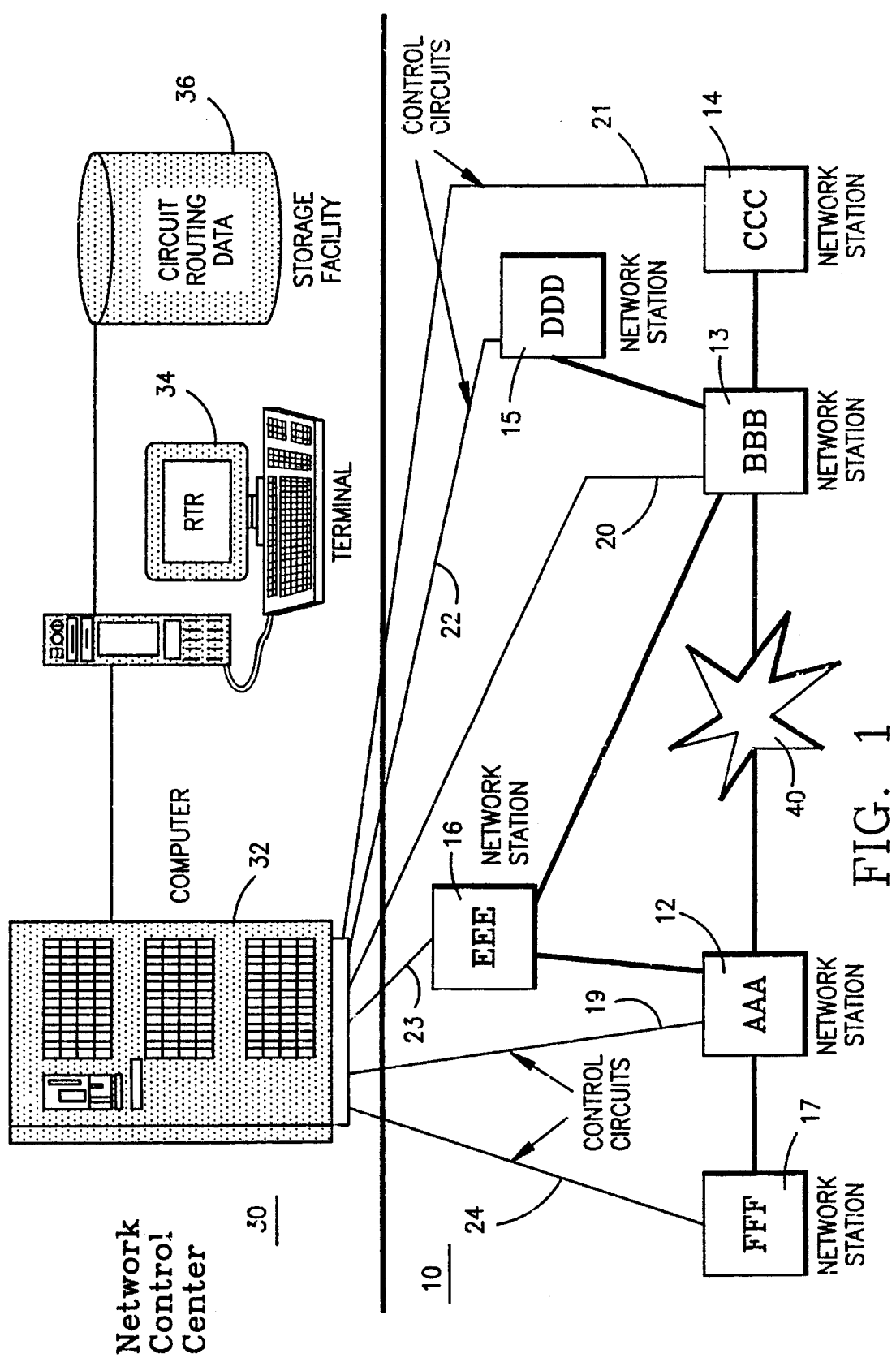
FIG. 1 shows a portion of a network, including a network control center, and is referred to herein for developing an understanding of the invention.

Initially, FIG. 1 may be referred to for developing an understanding of the invention. Generally, there is shown at least a portion of a telecommunications network 10 comprised of interconnected network stations, or nodes, AAA, BBB, CCC, DDD, EEE, and FFF designated as stations 12, 13, 14, 15, 16, and 17, respectively. Under normal conditions, communications traffic can be routed between the network nodes 12–17 and between these and other network nodes of the larger network of which the network portion 10 will be understood to possibly be part of.

In addition, each of the stations 12–17 of the network 10 are interconnected by control circuits 19–24, respectively, to a network management, or control center 30. The control circuits 19–24 may each be an X.25 circuit (as is well known) for carrying control communications between the associated station and the network control center 30. The network control center 30 is made up of a computer 32, which may be a mainframe computer such as the IBM Model 3090, a terminal 34 interactive with computer 32 to provide an interface for human interaction, and a storage facility 36 for storing network and circuit routing data.

When an outage, or disruption of telecommunications traffic, occurs, the equipment (such as stations 12–17) carrying circuits impacted by the disruption generate alarms that are sent via control circuits, such as circuits 19–24, to the network management system 30. From these alarms, the network management system 30 is able to determine the exact location of the outage, all of which may be carried out as is now known. Detailed information about the impacted circuits, including the path they follow and the equipment they pass through in different stations (as stations 12–17) along the path is retrieved from the storage facility, or data base 36. Information on the amount of spare capacity and the details regarding that (i.e., the circuits in the network that are not carrying any traffic) is also retrieved from the data base 36. In accordance with the invention, this information about the network is then transformed into a combinatorial process by which the impacted circuits are alternately routed so that the highest priority circuits are restored fastest, and then lower priority circuits are restored to the extent there is capacity for restoral remaining.

The alternate routes are implemented in the network 30 by establishing new connections via commands transmitted through the control circuits 19–24 or, alternatively, depending on the makeup of the station equipment used within the various stations 12–17, by some other means of transmission to effect or direct manual actions to be taken inside the stations 12–17. Actions for restoral directed through the control circuits is most effective in those instances wherein the new connections are established within the stations 12–17 by digital cross connect (DXC) equipment.

By the present invention, the network information, accessible for example in and by computer 32, is transformed into a graph with nodes and edges (i.e., an interconnection between nodes) representable by a set of algebraic equations as a mathematical model of the restoration problem. It is to be understood that the graph is not graphical in the usual pictorial sense, but rather it is the set of nodes and edges interconnecting the various nodes. This model of the network is solved based on a sophisticated, but well established, algorithm to determine the alternate routes in the graph which are then mapped back to alternate routes in the telecommunications network.

The invention makes use of a multicommodity model which arises naturally in solving problems that involve the transport of commodities, including the transport of communications traffic on an underlying network. The commodity concept is well known in the field of telecommunications, but it may be briefly explained here in terms of the transport of telecommunications commodities in the form of the well known, standard DS3 digital communications stream. It will be recognized, of course, that the choice here of DS3 as a telecommunications commodity is merely for discussion purposes and that the invention is itself useful for other telecommunications "commodities." Illustratively, the problem is viewed as one of connecting a required number of DS3 streams between two nodes of a given network having a finite capacity. One of the two nodes may be regarded as a supply point, the other as a demand point, and the DS3 as the commodity to be transported between the supply and demand nodes. The problem is to satisfy demand from supply points. Each distinct pair of supply and demand points defines a commodity, and a multicommodity network model is used to solve the problem.

As an example of the commodity concept, consider the four stations AAA, BBB, CCC and DDD, which need not be, but which could be, the same as those illustrated in FIG. 1. Should the problem, for example, be to restore three DS3s between AAA and BBB, two between BBB and CCC, and five between AAA and DDD, then a DS3 from AAA to BBB can be considered simply as commodity "a", a DS3 between BBB and CCC as commodity "b", and a DS3 between AAA and DDD as commodity "c". The problem of restoring the required DS3s is the same as flowing three units of commodity a, two units of commodity b, and five units of commodity c across the spare network. This has to be done, of course, without violating capacity restraints of the spare network and desirably such that total cost is minimized. The cost is a function of service type and the transmission cost, in terms of quality of different technologies, and the cost of manual patching.

Rules for Constructing the Model

A multicommodity network thus has commodities to be transported and an underlying physical network with nodes (i.e., stations) and edges (i.e., interconnecting routes). A commodity has the three attributes of: (i) an origination node (a supply point); (ii) a destination node (a demand point); and (iii) the number of commodity units that are to be routed between the origination-destination pair. An edge between two nodes has a direction and the four attributes of: (i) a from node; (ii) a to node; (iii) a traffic carrying capacity; and (iv) a relative cost. Following is a discussion of the rules for determining commodities and edges.

Commodities are determined from impacted routes and priorities for restoral. Trunks of the network with the same end points, impacted routes and priorities are combined as one commodity. The units of that commodity are the number of trunks therein. For example, in the six node network of FIG. 1 wherein an outage 40 is shown as occurring between stations AAA (12) and BBB (13) (as, by example, a fiber cable cut), the following Table I (assuming for discussion purposes that the disrupted fiber link contains certain trunks as indicated) can be taken as illustrative of the routes with circuits between nodes and the priorities of the circuits.

TABLE I

| Trunk ID | Priority | Stations |
|---|---|---|
| 111 | low | AAA |
| 111 | low | BBB |
| 111 | low | CCC |
| 222 | low | AAA |
| 222 | low | BBB |
| 222 | low | DDD |
| 333 | low | AAA |
| 333 | low | BBB |
| 333 | low | CCC |
| 444 | high | AAA |
| 444 | high | BBB |
| 444 | high | CCC |
| 555 | high | FFF |
| 555 | high | AAA |
| 555 | high | BBB |
| 555 | high | DDD |

Here there are four commodities. Trunks 111 and 333 are two units of a commodity, say commodity 1; 222 is a unit of commodity 2 (not a unit of commodity 1 because it has a different origination-destination pair, AAA–DDD, than commodity 1); 444 is a unit of commodity 3 (different from commodity 1 because circuit 444 has a high priority); and 555 is a unit of commodity 4. The resulting commodity table for this example is as follows.

TABLE II

| Commodity | From | To | Units |
|---|---|---|---|
| 1 | AAA | CCC | 2 |
| 2 | AAA | DDD | 1 |
| 3 | AAA | CCC | 1 |
| 4 | FFF | DDD | 1 |

Since point-to-point routes are being found, it is important to use the spare capacity—which may be scarce—economically. One of the goals, therefore, is to use impacted routes whenever possible. The impacted route is the route of a circuit before an outage occurs. To achieve this goal of utilizing working parts of impacted circuits the transmission edges are classified into two types; i.e., (i) impacted edges, and (ii) spare edges. Impacted edges are derived from working sections of trunks that were carrying live traffic before the outage; spare edges are derived from spare facilities that are specifically used to reroute circuits in the event of an outage.

The capacity of edges on impacted trunks is determined by adding the number of trunks between two stations regardless of the transmission media that the trunks use. For the foregoing example, edges and the capacities are given by the following, Table III.

TABLE III

| Edge | From | To | Capacity |
|---|---|---|---|
| 1 | A | F | 1 |
| 2 | B | C | 3 |
| 3 | B | D | 2 |

There is no edge from station AAA (12) to station BBB (13) since that link is where the outage has occurred and it is not functioning. When a commodity is solved for (when a commodity is routed) only those impacted edges are used that contain trunks for that commodity. Impacted edges that do not contain a trunk for the commodity are ignored.

Edges from the spare network (i.e., spare trunks that are used exclusively for restoration) and their capacity are considered for the model. A spare edge may be determined by a trunk code that describes the quality of transmission expected from it in an outage, whether or not the trunk is on a digital cross-connect, and the adjacent node information. Two nodes that are connected by an edge (or trunk) are referred to as adjacent nodes. For illustration, the trunks between stations A and B, 51 and 52, respectively, as shown in FIG. 2(A) may be considered.

Figure 2A:
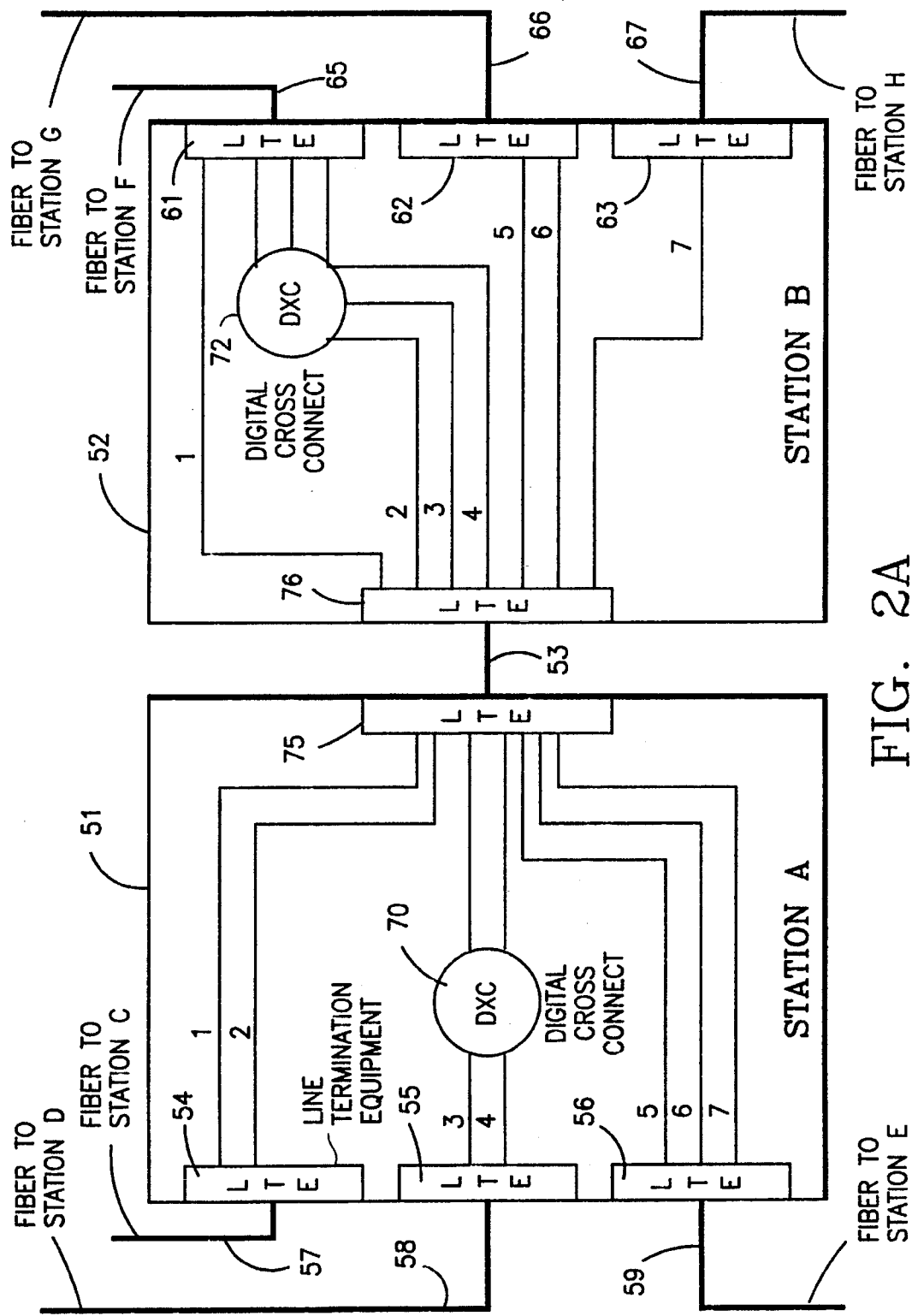
FIG. 2, consisting of FIGS. 2A and 2B, illustrates two network stations and the grouping of trunks to determine transmission edges and their capacities in accordance with the invention.
Figure 2B:
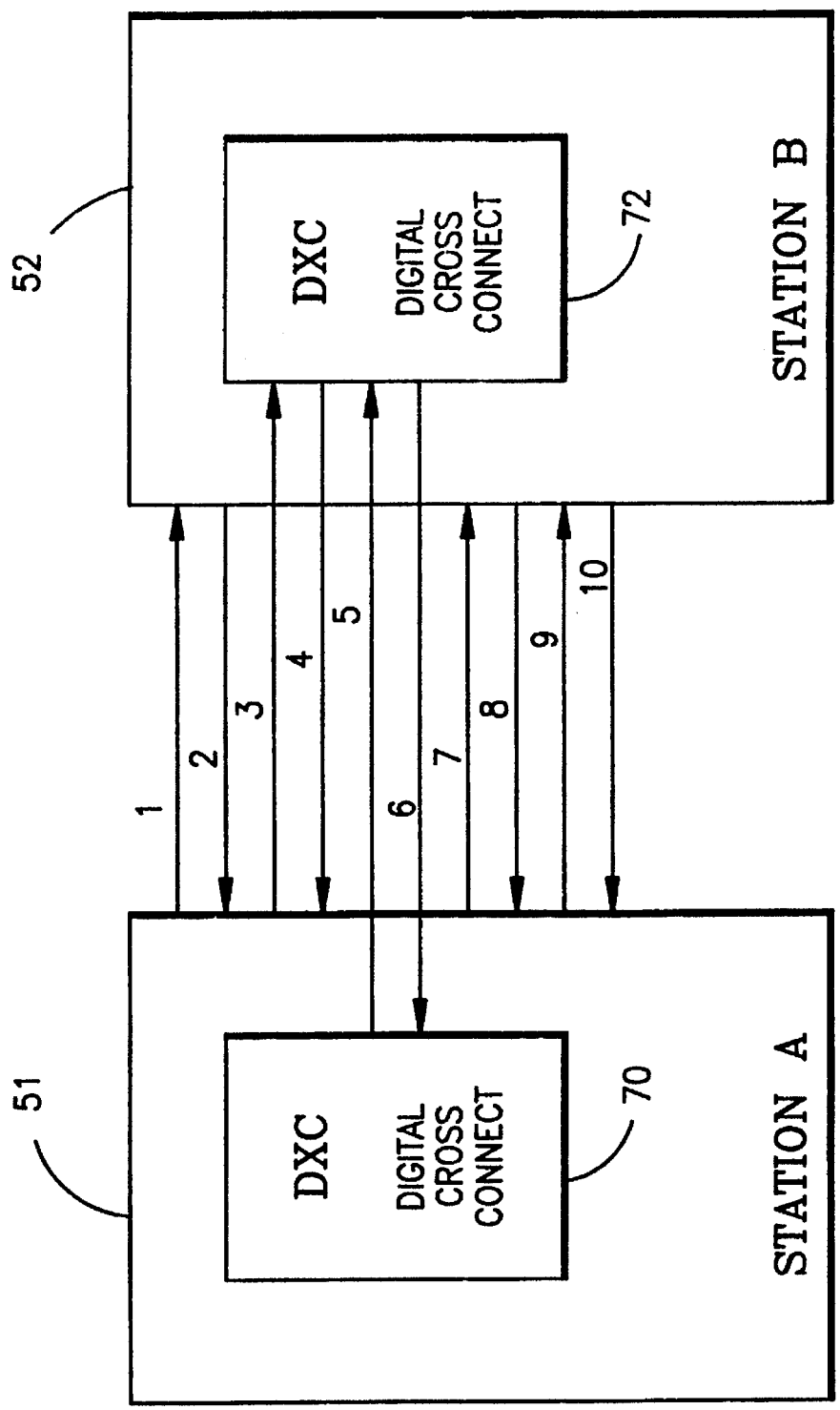

In FIG. 2(A), station A is shown to have line terminating equipment (LTE) sections 54, 55, and 56, into which are brought fiber cables 57, 58, and 59, respectively, from corresponding remote stations C, D, and E (these latter stations are not specifically illustrated). Similarly, station B includes line terminating equipment sections 61, 62, and 63 interconnecting that station to remote stations F, G, and H (also not illustrated) via fiber cables 65, 66, and 67, respectively. Station A includes DXC 70 and station B includes DXC 72, through each of which certain trunks pass. The two stations, A and B, are interconnected by a fiber cable 53, terminated at station A in LTE 75 and in station B in LTE 76.

Seven trunks are illustrated to pass between Stations A and B. Within station A, trunks 1 and 2, interconnected from station C, are directly patched between LTEs 54 and 75; trunks 3 and 4 are interconnected from station D on LTE 55 and pass via DXC 70 to LTE 75; and trunks 5–7, interconnected from station E, are directly patched between LTEs 56 and 75. Within station B, trunk 1 is patched directly between LTE 76 and LTE 61 to interconnect to station F; trunks 2, 3, and 4 pass via DXC 72 to LTE 61 also to interconnect to station F; trunks 5 and 6 are directly patched between LTEs 76 and 62 for interconnection to station G; and trunk 7 is directly patched between LTEs 76 and 63 to interconnect to station H.

The following, Table IV, shows the attributes to be considered if the trunks that are used to generate transmission edges are from spare trunks.

TABLE IV

| Trunk ID | Station Equipment | | Trunk Type | Trunk Code | Adjacent | |
|---|---|---|---|---|---|---|
| | A | B | | | A | B |
| 1 | Non DXC | Non DXC | Spare | RESX | C | F |
| 2 | Non DXC | DXC | Spare | RESX | C | F |
| 3 | DXC | DXC | Spare | REST | D | F |
| 4 | DXC | DXC | Spare | REST | D | F |
| 5 | Non DXC | Non DXC | Spare | RESX | E | G |

TABLE IV-continued

| Trunk ID | Station Equipment A | Station Equipment B | Trunk Type | Trunk Code | Adjacent A | Adjacent B |
|---|---|---|---|---|---|---|
| 6 | Non DXC | Non DXC | Spare | RESX | E | G |
| 7 | Non DXC | Non DXC | Spare | REST | E | H |

The five fields of the Table are checked for each trunk (excluding trunk IDs) to determine the edges and their capacities between stations A and B. Trunks with all five fields identical belong to the same edge. By this rule, trunks 3 and 4 belong to one edge and trunks 5 and 6 to another. All other trunks form an edge of capacity 1 each. Since, mathematically, an edge has a direction, for modelling purposes, and to describe connection in the opposite direction, each transmission edge (i.e., both the impacted and the spare edges) is duplicated with identical attributes, but each duplicate is given an opposite direction. For example, an edge from A to B with capacity k, cost c will be duplicated into an edge with the same capacity and cost, but will be directed from B to A. Following, Table V, is the table of edges generated from the trunks shown in FIG. 2(A).

TABLE V

| Edge | From | To | Capacity |
|---|---|---|---|
| 1 | A | B | 1 |
| 2 | B | A | 1 |
| 3 | A | B | 1 |
| 4 | B | A | 1 |
| 5 | A | B | 2 |
| 6 | B | A | 2 |
| 7 | A | B | 2 |
| 8 | B | A | 2 |
| 9 | A | B | 1 |
| 10 | B | A | 1 |

FIG. (2B) shows the edges between stations A and B whereby edges 2, 4, 6, 8, and 10 are reverse direction edges of edges 1, 3, 5, 7, and 9, respectively. In general, an edge n+1 of the model is identical to edge n except the direction is reversed, so that it is possible to go from station A to station B and vice versa.

Actions Inside a Station

The foregoing processes, when carried out for example in the computer 32 of FIG. 1, will provide a model of the transmission network as it exists after the outage. The multicommodity model can be represented mathematically by techniques which are well known and which are believed not necessary to be discussed in mathematical detail herein for that reason. In general, for a discussion of the development of multicommodity modelling, reference can be made to the publication of A. A. Assad, "Multicommodity Network Flows - A Survey", *Networks*, Vol. 8, No. 1, Spring 1978, pp 37–91.

At this point, however, it will be recognized that the model of the network does not give any information about the actions that need to be taken inside a station (i.e., a node) to establish reroutes. Accordingly, trunks must be rerouted within a station by the operation of "patching" one trunk to another. Patches may be implemented through operation of digital cross-connect (DXC) switches which receive their patching instructions via the control circuits 19–24 of FIG. 1. Important time saving routing decisions can be taken with stations that have DXC capabilities. The invention is not constrained to that, however, and in the absence of such a device, trunks can be patched manually. In the latter case, the patching instructions can be relayed via the control circuits 19–24 or by any convenient or available means. Generally, due to the time and cost required it is preferable to reroute trunks so that manual patching is minimized.

Procedurally and computationally, to deal with this aspect of the rerouting, each station of the network is decomposed into more nodes, known as "dummy" nodes, and decision variables are introduced to reflect the various patching choices. The dummy nodes generated by decomposing a station are connected by "action" edges representing the actions required within a station to connect two transmission edges. The action edges ultimately determined to be implemented within a station are passed back to the appropriate station in the form of patching instructions as discussed above.

The dummy nodes generated from each station will depend on the number and attributes of the transmission edges that are actually incident upon that station. The decomposition of stations into dummy nodes can be carried out in four steps, followed for all stations.

Figure 3:
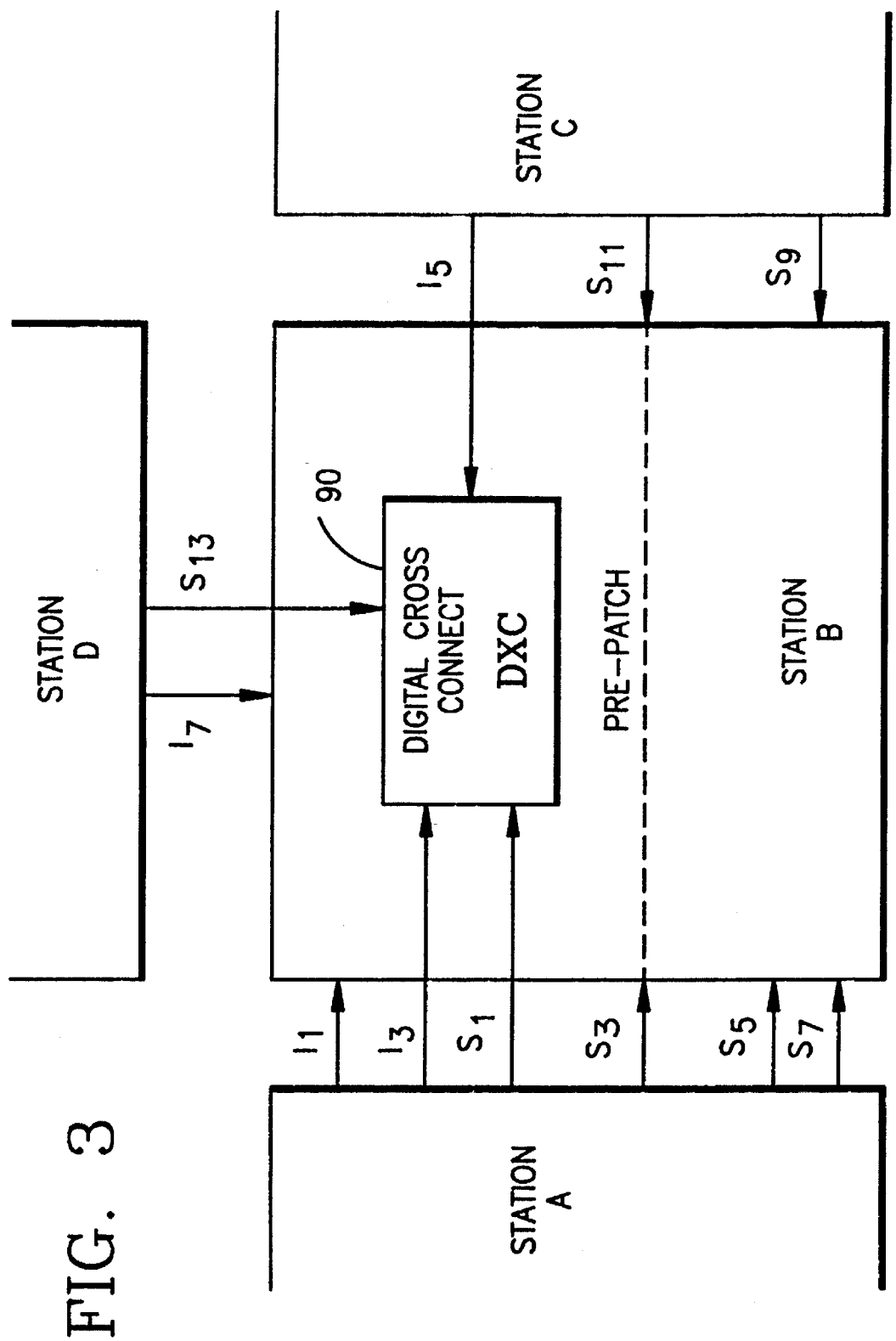
FIG. 3 illustrates how transmission edges coming into a network station are grouped as a preliminary step to the creation of "dummy node" pairs when carrying out the invention.

The decomposition may be described in connection with station B of FIG. 3. Station B, having a DXC 90, has incident upon it, from station A, spare transmission edges S1, S3, S5 and S7 and impacted transmission edges I1 and I3; from station C it receives spare transmission edges S11 and S9 and impacted transmission edge I5; and from station D it receives spare transmission edge S13 and impacted transmission edge I7.

The first step is to group all edges coming into a station by some criteria. For station B, for example, the following groupings may be made:

Group 1—All impacted edges on the DXC; here, that grouping consists of I3 from station A and I5 from station C.

Group 2—All impacted edges not on the DXC; for station B that grouping consists of I1 from station A and I7 from station D.

Group 3—All spare edges on the DXC; here consisting of S1 from station A and S13 from station D.

Group 4—All remaining edges not prepatched to any other edge; in this case that includes S5 and S7 from station A and S9 from station C.

Group 5—An edge prepatched to another edge (each grouped by itself); in this case, that would be S3 from station A.

Group 6—Preparched spare edge S11 from station C.

Figure 4:
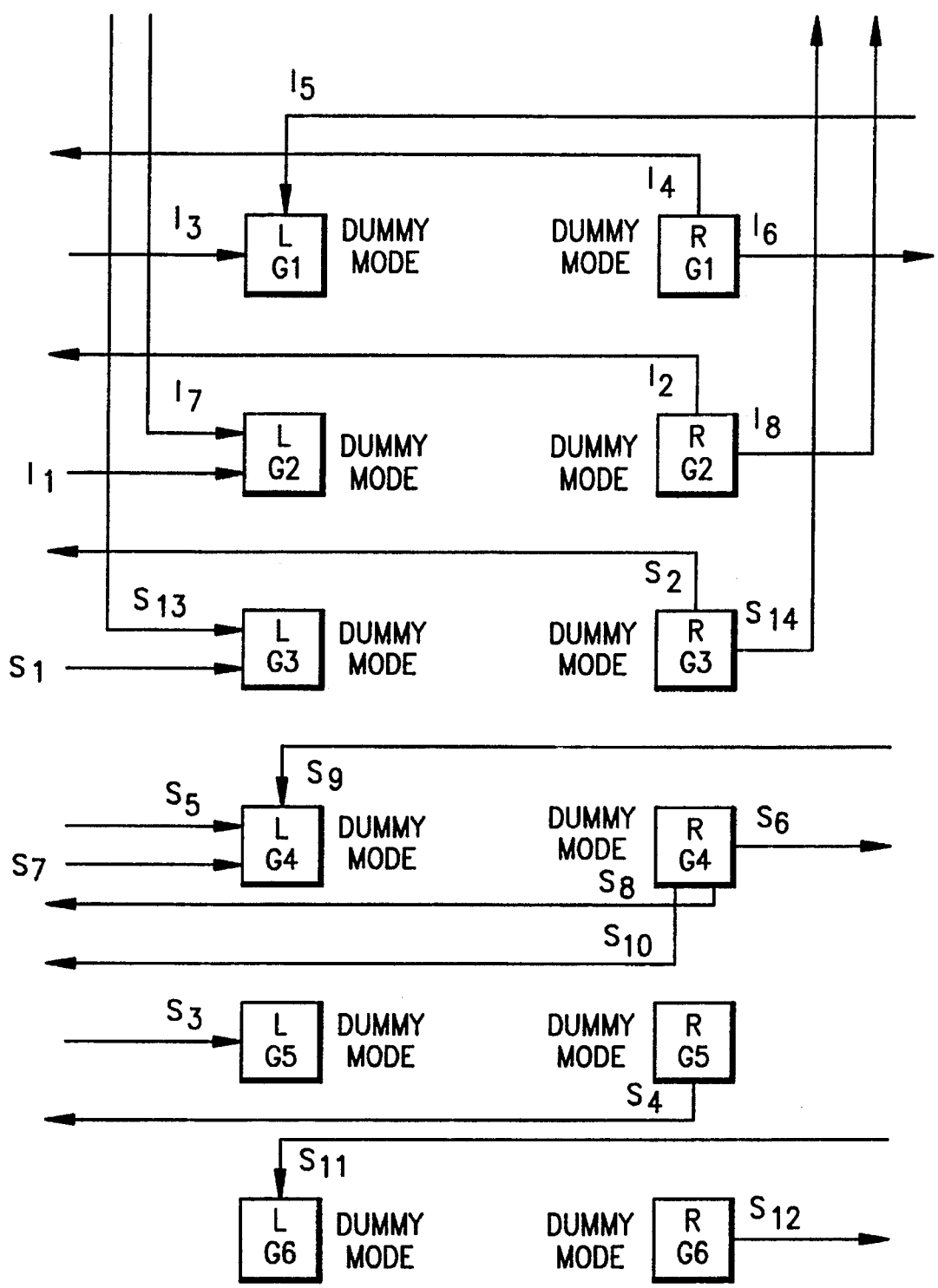
FIG. 4 illustrates the concept of dummy node pairs and the redirection of duplicate transmission edges as a step in a process according to the invention.

The next step, the results of which are illustrated in FIG. 4, is to create, at least representationally, a pair of dummy nodes for each group of edges. In this example, there results a pair of representational dummy nodes for each one of Groups 1–6 set out above. For convenience, each pair of dummy nodes has a left hand dummy node L and a right hand dummy node R, and each is marked in the drawing Figure with its Group number as G1, G2, etc.

Figure 6:
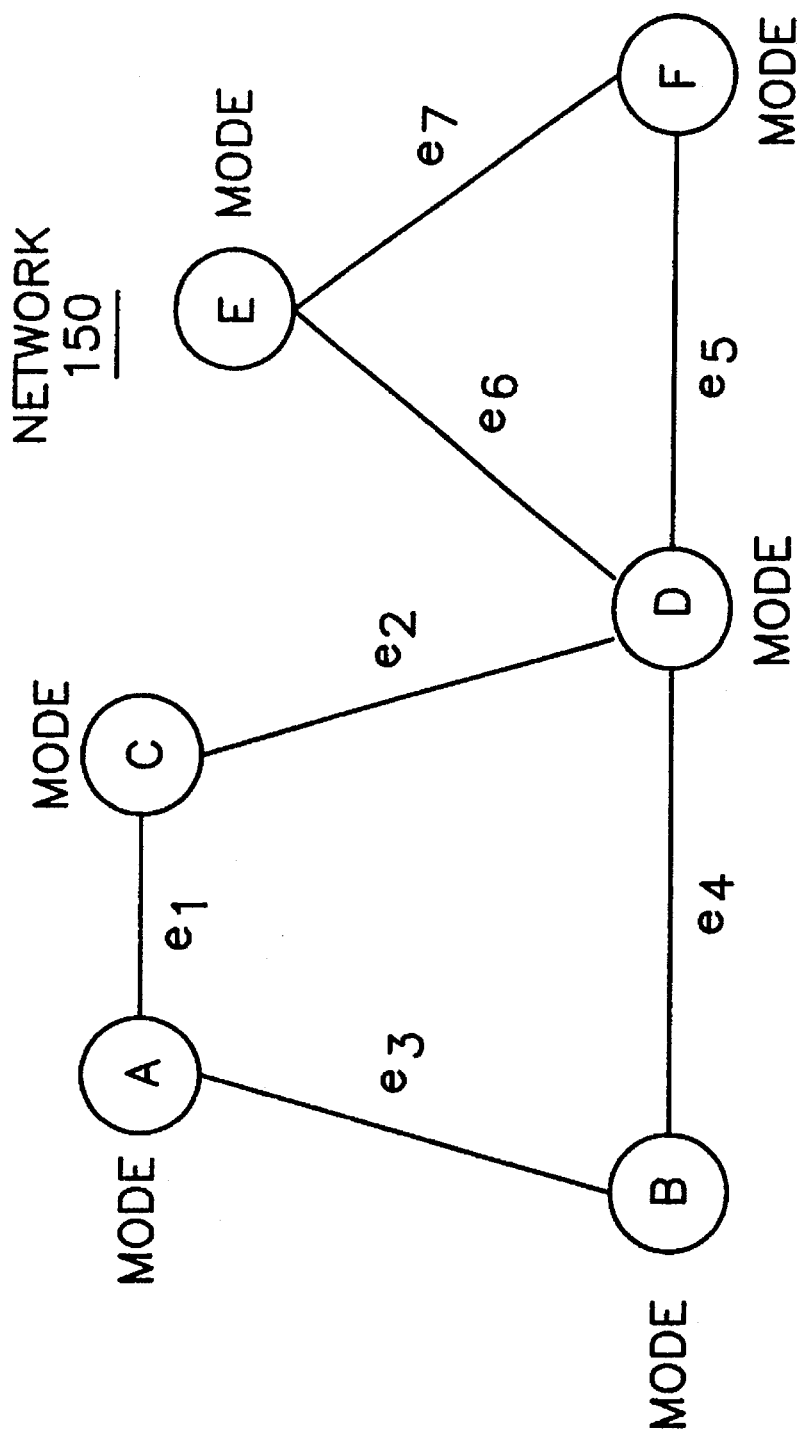
FIG. 6 is a simplified schematic diagram of a telecommunications network to illustrate the restoral of circuits on a priority basis.

The third step, also illustrated by FIG. 4 is to redirect (again, representationally) all the transmission edges coming into a station to the node L of the Group that the edge belongs to and to redirect the duplicate transmission edges leaving the station to leave from the R node of the Group to which they belong. In FIG. 6 station B has been decomposed in to six pair of dummy nodes, one pair for each Group. Incident impacted transmission edge I3 from station A (FIG. 3), for example, has its duplicate transmission edge I4 directed in the opposite direction, back to station A. The other transmission edges, both spare and impacted, also have duplicate edges directed accordingly.

Figure 5:
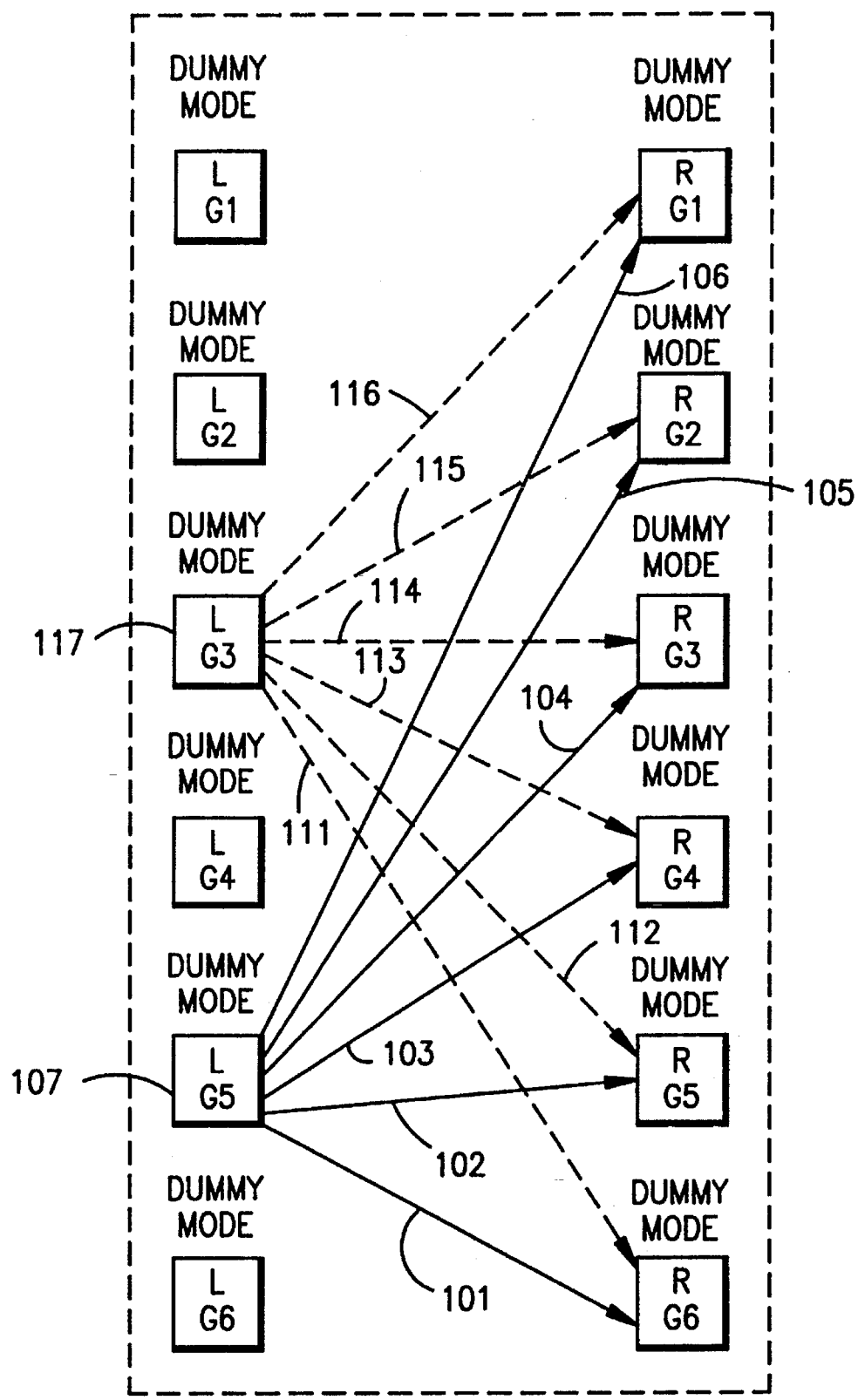
FIG. 5 illustrates, for a station of the network, the creation of "action edges" as potential actions to be taken within a station for restoring traffic following a network outage.

The fourth, and final, step, illustrated in FIG. 5, is to create a potential "action" edge from each L node to each R node. FIG. 5 is simplified somewhat in that only the action edges 101–106 from the L node 107 of Group 5 and the action edges 111–116 from L node 117 of Group 3 are illustrated; the others will be understood to be allowed for, but they are omitted for purposes of simplification. The capacity of each action edge may be regarded as unlimited although the cost of a particular one reflects the desirability of taking the action that the edge represents. In other words, all of the action edges represent the possibilities for actions to be taken within a station, each having some relative associated cost. The purpose is to select, for actual implementation, those action edges which will restore the network from the outage, taking into account the relative costs and the need to restore high priority circuits in preference to others of lower priority.

Following these rules, the physical network is transformed into a representational graph G(N,E) where N is the set of nodes and E is the set of edges, including all the impacted, spare and action edges.

Route Finding

To find reroutes in the network, the above-described model, based on the list of commodities and the underlying physical network, is solved in the computer 32 of FIG. 1 by using a fast algorithm of the kind well known in the field of mathematics and applicable to communications networks dealt with on a multicommodity basis. Suitable algorithms are described in the textbook of Kennington, J. L. and Helgason, R. V. entitled "Algorithms for Network Programming" published by John Wiley and Sons (1980) and in the book of Ahuja, R. K., Magnanti, T. L., and Orlin, J. B. entitled "Network Flows: Theory and Algorithms", published by Prentice Hall (1993).

To reduce the computation time, and to achieve the goal of restoring high priority circuits quickly, it is preferable in reaching a solution to the model to convert the multicommodity problem into K single commodity problems, where K is the number of commodities. This allows the overall problem to be solved sequentially, solving first for the highest priority commodity and then solving sequentially in order of descending priorities for other commodities. This is illustrated by reference to FIG. 6 wherein the network 150 is shown to include nodes A, B, C, D, E, and F, interconnected as shown with edge e1 between nodes A and C, edge e2 between nodes C and D, edge e3 between nodes A and B, edge e4 between nodes B and D, edge e5 between nodes D and F, edge e6 between nodes D and E, and edge e7 between nodes E and F. For explanation purposes, it may be assumed that there is a break in the connection between nodes C and E; that is, the network 150 is illustrated as it exists after the break.

For discussion as an example, consider that it is desirable to deliver two commodities within the network 150: (i) a commodity 1, of high priority, from node A to node F, and (ii) a commodity 2, of lower priority, from node C to node E. While it is at least theoretically possible to solve the multicommodity problem simultaneously, for those reasons mentioned above, it is preferred to solve the individual commodities sequentially in order of priority, one commodity at a time. In this example, a solution is first found for routing commodity 1 from A to F since it has the highest priority. The actual path of C to E, and the commodity 2 desired to be shipped from C to E, are ignored, at least in the first iteration. The first solution may provide, for example, for routing of commodity 1 from node A to node F via edges e1, e2 and e5.

Following the provision of a solution for commodity 1, the network 150 is remodeled, taking into account the capacities and circuits which have become unavailable because they were used for obtaining solutions to the higher priority commodities, and a solution is then sought for the next highest priority commodity. In this example, a solution would next be sought for commodity 2. Notable, however, is that a solution is not guaranteed, since the capacity for restoral may have been utilized in first providing solutions to the higher priority commodities. Nevertheless, the capacity for restoral will be allocated for use in accordance with priority and solutions will be provided until the restoral capacity is exhausted.

In solving for commodity a cost factor (which may be relative) is associated with every edge, reflecting the desirability of routing a circuit on that edge. In the restoration system there are, as has been noted herein, three kinds of edges: (i) impacted edges (capacity remaining on a path affected by the outage), (ii) spare edges, and (iii) action edges. The cost of impacted edges is very low, generally some fixed number. Thus, optimally it is desirable to find reroutes for circuits by choosing edges on the old path. The cost of spare edges is established in advance and that can be reflected in the associated trunk code. In Table IV, for example, the trunk code RESX or REST will be indicative of the cost associated with use of the respective trunk. The cost of action edges depends on the kind of action actually to be taken. For example, if a manual patch is to be made, the cost will be rather high as compared to a DXC patch whereby the cost will be lower. The relative cost factors are taken into account by use of the algorithmic techniques mentioned above when the model is solved.

Implementation of Alternate Routes

By considering the action edges in the model (FIG. 5), the alternate routes obtained from solving a commodity provide a description of what particular actions are needed at the specific stations. For example, if an action edge connects the L dummy node for a group representing impacted edges on a DXC to an R dummy node for a group representing spare edges on the DXC, then it means a DXC patch is needed to connect the appropriate impacted circuits to the spare circuits. In the model, all possible actions that can be taken in all stations are represented by the action edges. A solution indicates the particular action actually to be taken in a particular station; that is, some of the action edges will be implemented, some will not.

Patching instructions, and the reroute plans generally, may be made available and presented for review at terminal 34 of the network control center 30 as shown in FIG. 1. The terminal 34, among other things, allows operating personnel to review and revise restoral and patching plans prior to their implementation in the network 10. This is advantageous in that it allows the expertise and judgment of such personnel to be exercised before a restoral plan is actually implemented. Electronic patching instructions that can be executed by a DXC are sent on the control network, lines 19–24, directly to the appropriate stations. Actions that require manual execution of instructions are returned as appropriate, including transmittal by such means as telephone calls, electronic mail, and faxes.

Overview of the Process

Figure 7:
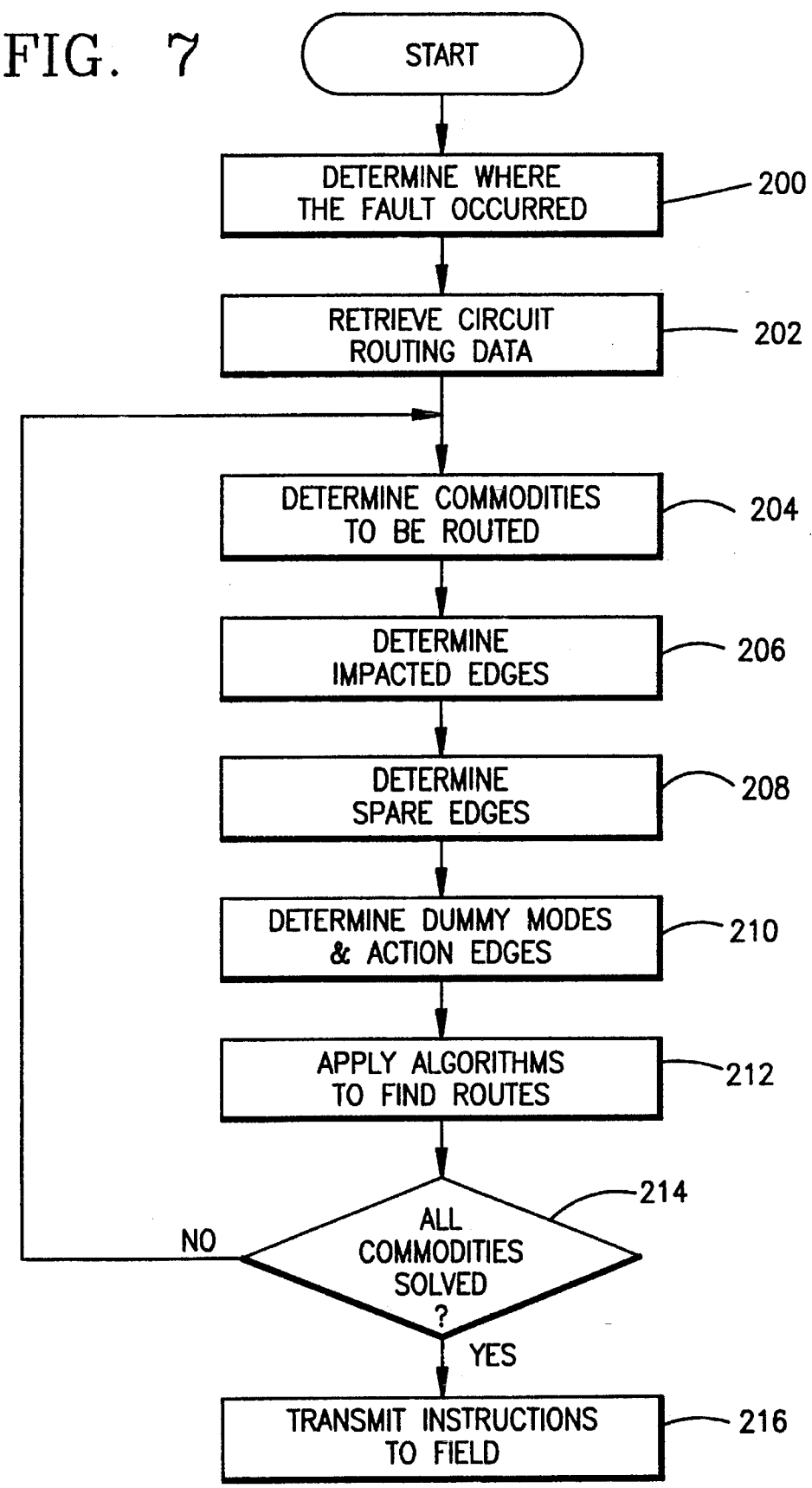
FIG. 7 is a flow chart of an overall process for restoral in accordance with the invention.

While the foregoing has described the process in detail, an overall perspective and summary thereof is provided by the flow chart of FIG. 7 when considered in connection with FIG. 1. Initially, in step 200, data is collected from the various nodes, via the control network, to determine where the fault has occurred within the communications network. At step 202, circuit data on spare and impacted circuits and their configuration is retrieved, which data may be obtained from the data storage facility 36 of FIG. 1. At step 204 a determination is made as to which commodities are to be rerouted and their priorities for restoral are established.

In steps 206 and 208, respectively, the impacted and spare edges and their capacities are determined. That is, some measure is obtained for the capacity available to supply the demand for restoral of the lost commodities.

For determining actions to be taken within a station for implementing a rerouting of traffic, at step 210, decision variables are established so that decisions can be made as to which actions are to be taken within a station. This step 210 includes the operations discussed above of grouping circuits incident upon a node into incident circuit groups having some criteria in common, of creating dummy nodes, of redirecting all circuits of each incident circuit group to the first dummy node of the group, of redirecting duplicate circuits from the second dummy node of the group, and of creating potential action edges between the dummy nodes. The actions to be taken are selected from the action edges established between the dummy nodes.

At this point the model of the network is sufficiently complete to apply an algorithm, as described above, at step 212 to determine reroutes in the network and actions to be taken in the various network stations. Preferably, the algorithm is applied first to the commodity of highest priority and rerouting is determined for that commodity, then other commodities are solved in order of priority until all commodities are solved or the available capacity for restoral is exhausted. Thus, the process is somewhat iterative as indicated by the decision point 214 at which the determination is made as to whether all commodities have been solved or there is no capacity yet available for restoral.

At step 216 the instructions for actions to be taken within a station are transmitted to those stations involved in the restoral process. Obviously these can be transmitted as each solution is obtained or as a group of solutions.

Thus, overall, there is shown and described an invention which is operative to provide for the rapid restoral of telecommunications traffic disrupted because of an outage in the transmission network which has been carrying the traffic. While a preferred form of the invention has been described, it will be recognized that various modifications may be made therein and that the invention may be implemented in various forms and embodiments and that the functionality of the invention may be achieved with various combinations of hardware and computer software. Among other things, in that regard, it will be observed that while certain operations in accordance with the invention may have been described as occurring generally in serial fashion, it is entirely within the scope of the invention to conduct some operations more or less simultaneously or even in reverse order from that described herein. It is intended to claim all such modifications and variations which fall within the true spirit and scope of the invention.

The invention claimed is:

1. For use with a telecommunications network having nodes interconnected by edges, a method for restoring telecommunications traffic in the network following a disruption of traffic due to a circuit outage affecting traffic between nodes, comprising the steps of:

(a) determining where within the network the outage occurred;

(b) retrieving prestored circuit routing data from a central data base;

(c) characterizing the telecommunications traffic disrupted by the outage as commodities for restoral;

(d) developing a multicommodity model of the network based on the information obtained from steps (a) and (b);

(e) establishing decision variables for determining actions potentially to be taken within the nodes;

(f) applying a multicommodity algorithm to the model and to the decision variables to determine (i) reroutes available via spare and impacted edges and (ii) actions to be taken within the nodes for achieving said reroutes;

(g) transmitting instructions for implementing the determined actions to all nodes affected by performance of step (f).

2. The method of claim 1 wherein (i) a restoral priority is established for each commodity to be restored; (ii) an edge capacity available for restoral is determined; and (iii) steps (d), (e), and (f) are repeatedly applied to the commodities in order of priority until all commodities are restored or the capacity available for restoral is exhausted.

3. The method of claim 2 wherein the multicommodity model is based on a measure of the commodities to be restored between nodes and the capacity available for restoral.

4. The method of claim 3 wherein the prestored circuit routing data includes information on spare edges and wherein the capacity available for restoral is determined from the capacity remaining available in impacted edges and from spare edge groups, said spare edge groups being formed from spare edges between nodes which have preselected attributes in common.

5. The method of claim 4 wherein the decision variables are established for a node by grouping all incident edges into groups such that the incident edges of a group all meet a common preselected criterion, and further including the steps of: creating a pair of dummy nodes having a first and a second dummy node for each incident edge group; redirecting all edges of each incident edge group to the first dummy node of the pair with which that group is associated; redirecting duplicate edges of each incident edge group from the second dummy node of the pair with which that group is associated; and creating a potential action edge between each first dummy node and each second dummy node from which the actions to be taken within a node may be selected.

6. The method of claim 5 including the further step of establishing a cost factor for each impacted edge having capacity remaining for restoral, for each spare edge, and for each potential action edge, and wherein such cost factors are used in step (f) so that the reroutes and actions are determined to be at the lowest cost.

7. The method of claim 6 wherein in step (a) the location of the outage is determined via control circuits providing outage alarms and in step (g) the instructions for implementing the actions to be taken in said nodes are transmitted via said control circuits.

8. The method of claim 5 wherein prior to step (g) the reroutes and actions determined in step (f) are provided for review and approval by operating personnel.

9. For a communications network having nodes and routes providing circuits interconnecting the nodes, each circuit having some capacity for carrying communications traffic as a commodity, a method for restoring commodities between nodes following a disruption of traffic due to a circuit outage, comprising the steps of:

(a) determining where within the network the outage occurred;

(b) retrieving prestored circuit routing data from a central data base;

(c) developing a multicommodity model of the network based on the information obtained from steps (a) and (b) by
  (i) determining a measure of the commodities desired to be restored between nodes;
  (ii) determining capacity available for restoral by
    (ii') determining capacity in each remaining circuit which was carrying traffic affected by the outage;
    (ii") grouping spare circuits between adjacent nodes into spare circuit groups wherein the spare circuits of a group have certain attributes in common;
    (ii'") determining capacity in each spare circuit group;

(d) establishing decision variables to determine actions to be taken within a node by
  (i) grouping all circuits incident upon the node into incident circuit groups wherein the incident circuits of a group meet a common preselected criteria;
  (ii) creating a pair of dummy nodes for each incident circuit group, each pair having a first and a second dummy node;
  (iii) redirecting all circuits of each incident circuit group to the first dummy node of the dummy node pair with which that group is associated;
  (iv) redirecting duplicate circuits of each incident circuit groups from the second dummy node of the dummy node pair with which that group is associated;
  (v) creating a potential action connection between each first dummy node and each second dummy node;

(e) establishing a restoral priority for each commodity to be restored;

(f) applying a multicommodity algorithm to the model and to the decision variables to determine a reroute and actions to be taken within a node for the commodity having the highest priority;

(g) repeating steps (c), (d), and (f) in order of priority for each remaining commodity to be restored until either reroutes are determined for all remaining commodities to be restored or the capacity for restoral is exhausted, taking into account in each repetition, any changes in capacity resulting from prior higher priority determinations; and (h) transmitting instructions for implementing the determined actions to all nodes affected by performance of step (g).

* * * * *